June 6, 1967 M. TRUPP 3,323,759
CONSOLE COMPOUNDED WAKE PROPULSION SYSTEM
Filed June 3, 1965 2 Sheets-Sheet 1

INVENTOR
MASON TRUPP

BY *Sherman Levy* ATTORNEY

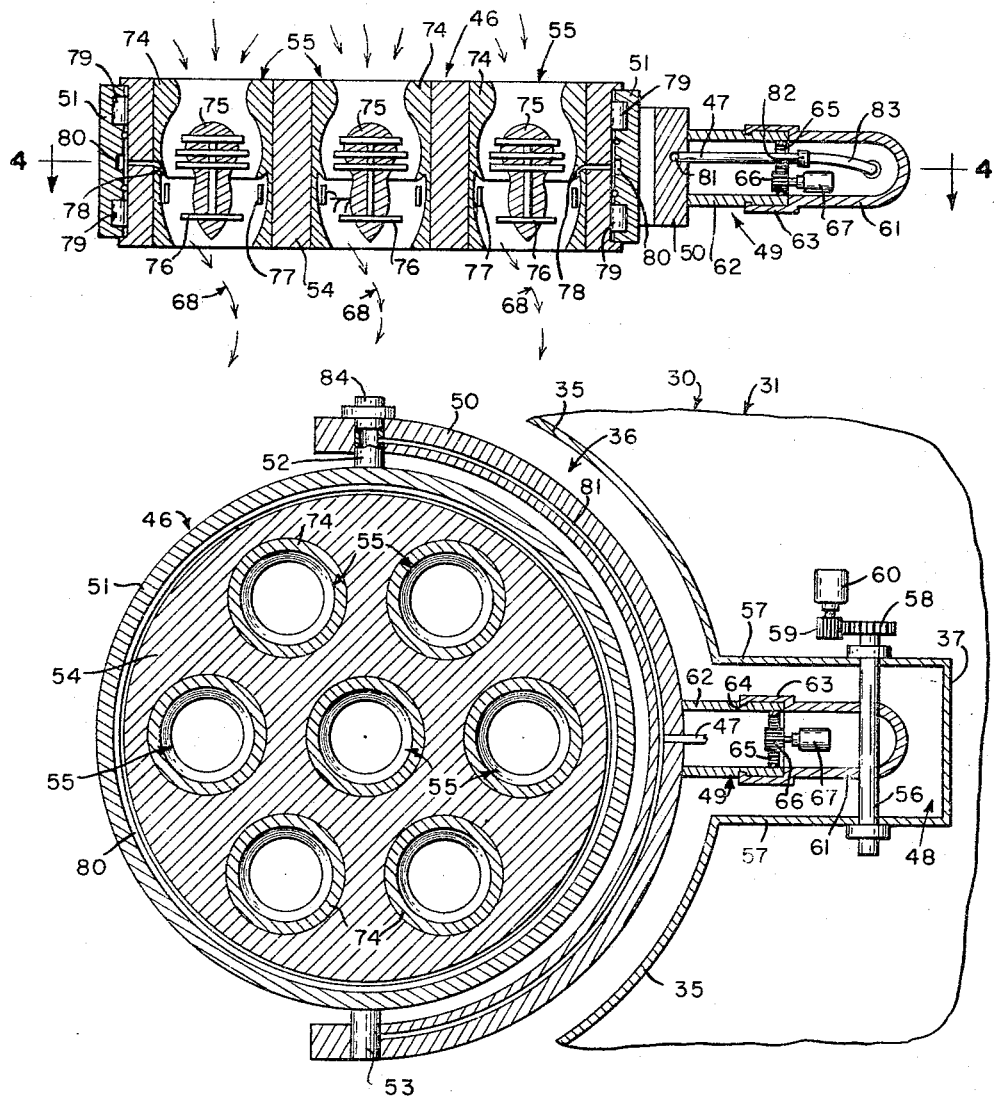

United States Patent Office 3,323,759
Patented June 6, 1967

3,323,759
CONSOLE COMPOUNDED WAKE PROPULSION SYSTEM
Mason Trupp, 310 Blanca Lane, Tampa, Fla. 33606
Filed June 3, 1965, Ser. No. 461,179
3 Claims. (Cl. 244—62)

The present invention relates to a propulsion system or mechanism, and the present invention is a continuation-in-part of prior patent application Ser. No. 372,178, now Patent No. 3,250,495 and 395,535, now Patent No. 3,250,496.

It is among the objects of the present invention to provide a propulsion system or mechanism which utilizes a console that whirls to produce an organized spiral thrust, and wherein the spinning of the console produces certain important and novel advantages over conventional aircraft and the like.

Another object is to provide a propulsion mechanism which utilizes a spinning console that can be used in supersonic and hypersonic vehicles, aircraft and the like, and wherein the spinning console can be used in a saucer type or design of aircraft or else it can be used in any other type of aircraft design as desired or required, and wherein a craft constructed and operated according to the present invention will function as a jet propelled and energized flying gyroscope which has important advantages insofar as stability, orientation and capability of sustaining itself in proper flight even when passing through turbulent air masses regardless of the altitude at which the craft is being operated.

A still further object of the present invention is to provide an aircraft that will minimize metal fatigue, as well as providing increased lift obtained by utilizing a biconcave construction, and wherein there is also provided an improved means for guiding and steering the vehicle or craft, as well as means for braking the speed of the vehicle or craft, and wherein a single throttle can be used for control of a plurality of engines, and wherein the present invention will also eliminate the necessity of being troubled by mechanical difficulties in conventional parts such as rudders, flaps, wing extensions for controls and the like, and wherein passengers and cargo can be transported with increased stability or comfort.

Still further objects and advantages will appear in the more detailed description set forth below, it being understood however that this more detailed description is given by way of illustration and explanation only and not by way of limitation, since various changes therein may be made by those skilled in the art without departing from the scope and spirit of the present invention.

Figure 1:
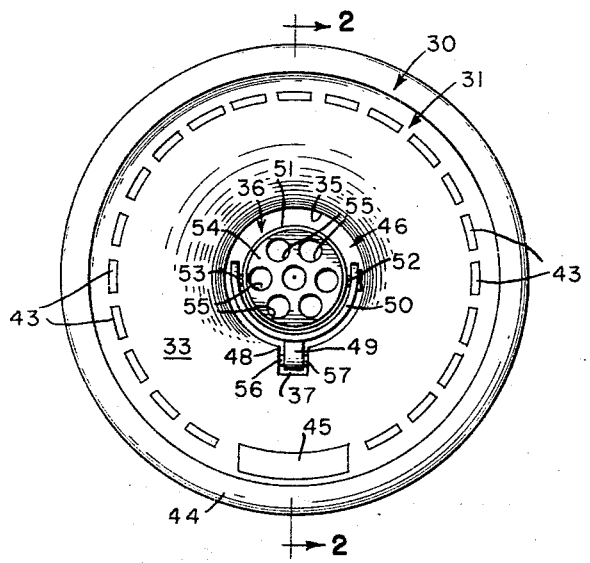
Figure 2:
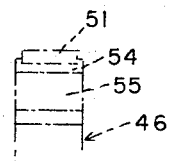
Figure 2:
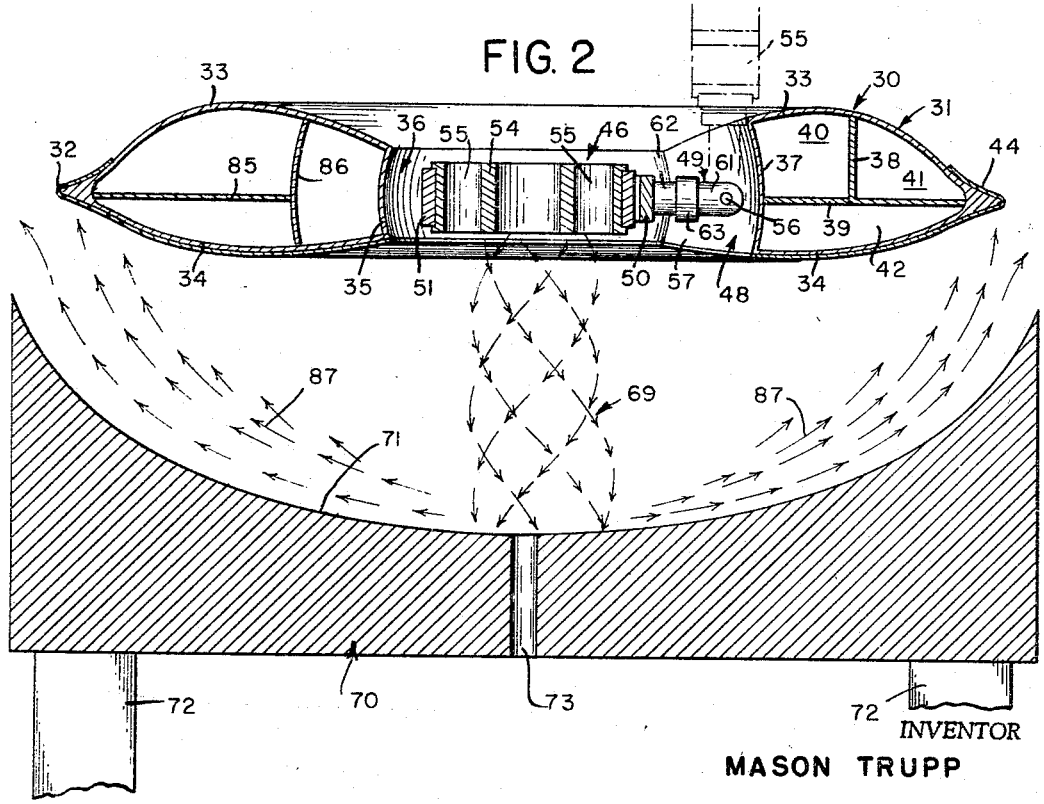

In the drawings wherein like reference characters denote corresponding parts throughout the several views:
FIG. 1 is a top plan view illustrating a biconcave saucer design incorporating the present invention.
FIG. 2 is an enlarged sectional view taken on the line 2—2 of FIG. 1 and showing a track arrangement.
FIG. 3 is an enlarged sectional view showing certain constructional details of the present invention including the console.
FIG. 4 is a sectional view taken on the line 4—4 of FIG. 3.

Referring in detail to the drawings, the numeral 30 indicates an aircraft or vehicle which is shown of a biconcave flying saucer design or configuration, and the craft or vehicle 30 includes a disk-shaped or annular body member 31 which has its outer periphery indicated by the numeral 32, FIG. 2. The member 31 further includes generally arcuate top and bottom surfaces or walls 33 and 34 as well as an inner circular wall portion 35, and the inner central portion of the body member 31 is open as indicated by the numeral 36. The numeral 48 indicates a recessed portion which is partially bounded or defined by wall section 37. Partitions or wall sections 38 and 39 are adapted to be arranged in the member 31 whereby there is defined within the hollow member 31 compartments or chambers such as those indicated by the numerals 40, 41 and 42 and these compartments can be used for any desired purpose such as for the storage of cargo, passenger compartments, fuel compartments and the like.

As shown in FIG. 1, a plurality of windows 43 may be provided for the aircraft 30, and the numeral 44 indicates a re-entry shield for the craft. The numeral 45 indicates a pilot control chamber, cockpit or the like.

According to the present invention there is provided a compound jet propulsion unit which is indicated generally by the numeral 46. The numeral 47 indicates one or more fuel lines for supplying fuel from a suitable source of supply to the compound jet propulsion unit 46, and the numeral 49 indicates a standard or column for a purpose to be later described. The numeral 50 indicates a semi-circular yoke which is secured to or affixed to an end of the standard 49, FIG. 4, and a circular housing or ring member 51 is pivotally and swingably connected to the yoke 50 as at 52 and 53. The numeral 54 indicates a console of circular formation which is rotatably mounted in the housing 51, and a plurality of suitably constructed jet engines 55 are mounted in the console 54.

As shown in FIG. 4 a shaft 56 is journaled in wall portions 57 of the member 31, and the shaft 56 extends through the space 48 and the shaft 56 is adapted to be secured or affixed to the standard 49 in any suitable manner as, for example, by welding. A gear member 58 is suitably affixed to an end of the shaft 56, and a gear 59 is arranged in meshing engagement with the gear member 58, and the gear 59 is adapted to be driven by a suitable motor such as the motor 60 so that by properly actuating the motor 60, the gear 59 will rotate the gear 58 which in turn will rotate the shaft 56 so that the standard 49 can be pivoted or moved as, for example, from the solid line position shown in FIG. 2 to the broken line position of FIG. 2 or vice versa, as later described in this application.

As shown in FIG. 4 the standard 49 may be made in two parts or sections, namely the sections 61 and 62, with the section 61 being affixed to the shaft 56. A shoulder portion which is integral with the section 61 is adapted to have its end arranged in engagement with an annular groove 64 of the section 62 so that relative rotation between the sections 62 and 61 can take place. The section or part 62 is secured to or formed integral with the semi-circular yoke 50. The numeral 65 indicates a ring gear which is adapted to be suitably mounted within the section 62 of the standard 49, and a gear 66 meshes with the ring gear 65, the gear 66 adapted to be driven or rotated by a motor 67. This arrangement permits actuation of the motor 67 to rotate the gear which in turn rotates the ring gear 65, and with the ring gear 65 secured to the inner surface of the section 62, it will be seen this will result in rotational movement or swinging movement of the yoke 50 about an axis extending through the standard 49 so that the unit 46 can be positioned in the desired location to accomplish the desired purpose.

Each of the jet engines 55 is adapted to produce or provide its own wake as indicated by the numeral 68, FIG. 3, and the plurality of jet engines is adapted to produce a compound spiral wake as indicated by the numeral 69 in FIG. 2.

Attention is directed to FIG. 2 of the drawing wherein the numeral 70 indicates a track or trackway which may have an upper recessed surface 71, and the track 70 may be mounted on suitable supporting elements 72, and the numeral 73 indicates drainage openings for the passage downwardly therethrough of water, melted snow, ice and the like.

As shown in FIG. 3, the jet engines 55 may be of conventional construction and are adapted to include an outer shell or casing 74 as well as an air compressor 75, turbine 76, fuel burners 77, and fuel nozzles 78. The numeral 79 indicates bearings which are of a suitable construction and which are interposed between the housing 51 and rotary console 54, FIG. 3. Fuel passageways 80 are adapted to be provided and such passageways 80 may be in the form of an annular groove or recess in the housing 51, and the fuel passageways 80 may receive its supply of fuel through the hollow pivot elements 52 and 53 which in turn receive fuel from a fuel passageway 81 in the yoke 50, FIG. 4, and the passageway 81 is adapted to have the fuel line 47 connected thereto. A rotary seal 82 may be provided for connecting the fuel line 47 to another fuel line 83 which leads to a suitably positioned fuel tank in the craft 30. A power drive unit 84 may be operatively connected to the device adjacent the pivot mounting 52, FIG. 4.

From the foregoing, it will be seen that there has been provided an improved aircraft or vehicle propulsion mechanism, and the propulsion mechanism or unit of the present invention can be applied or used with various types of aircraft or the like. Thus, while the drawings of the present application illustrate the compound jet propulsion unit 46 of the present invention mounted in a biconcave flying saucer type of device 30, it is to be understood that the principles of the present invention are applicable to any type or design of aircraft including aircraft having the usual fuselage, wings and the like. The biconcave saucer 30 is adapted to have a hollow interior and may include inner walls or partitions 85 and 86, FIG. 2, as well as the previously described walls and partitions so that there is defined or provided various compartments within the craft 30 that can be used for any desired purpose.

Also, with the parts arranged as shown in the drawings, the entire compound jet propulsion unit 46 can be swivelled or pivoted about an axis extending through the shaft 56 by properly actuating the motor 60 because as the motor 60 is actuated, the gear 59 rotates to turn the gear 58 and with the gear 58 connected to the shaft 56, and with the shaft 56 connected to the standard 49, the standard 49 will be moved or pivoted to thereby move the yoke 50 in a corresponding manner. Since the housing 51 is connected to the yoke 50 as at 52 and 53, and because the housing 51 has the console 54 mounted therein, it will be seen that this actuation of the motor 60 will result in pivotal movement or swinging movement of the unit 46 so that for example the unit 46 can be moved from the solid line position of FIG. 2 to the broken line position of FIG. 2 or vice versa, or else this arrangement permits the unit 46 to be positioned at any desired intermediate position as desired.

In addition, the present invention includes a means for adjusting or rotating the section 62 of the standard independently of the section 61 and this last means includes the motor 67 which drives the gear 66, and since the gear 66 meshes with the gear 65 on the interior of the section 62, it will be seen that by properly actuating the motor 67, the section 62 will be rotated relative to the section 1. Thus, with the section 52 secured or affixed to the yoke 50, it will be seen that this will result in pivoting or swivelling the yoke 50 about an axis which extends longitudinally through the standard 49 so that this provides an additional adjusting feature for the present invention. The fuel lines 47 and 83 are adapted to be interconnected by a rotary seal 82, FIG. 3, so that as the parts are swivelled or adjusted, the rotary seal 82 will insure that the fuel lines or hoses remain connected so that fuel for the jet engines will flow or be supplied in the proper manner. The fuel can be supplied from any suitable location such as fuel tanks arranged in one of the compartments within the craft 30, and this fuel is adapted to be pumped or flow through the lines 83 and 47 into the passageway 81 and then through the hollow fittings 52 and 53 to the passageway 80, and from the passageway 80 fuel is adaped to flow through the jet nozzles 78 whereby the fuel can be burned in the proper manner by the burners 77 which may be of conventional construction, FIG. 3. Due to the provision of the annular groove 80, the jet nozzles 78 will be continuously supplied with fuel even though the console 54 is rotating within the housing 51.

The jet engines 55 may be of any desired construction or configuration and are adapted to include the air compressors 75 as well as the turbines 76 and associated parts, and each of these jet engines 55 is adapted to produce a separate wake or thrust as indicated by the numeral 68 in FIG. 3. Then, because of the arrangement of the parts of the present invention, the individual jet streams or wakes 68 will combine as shown in FIG. 2 to provide a compound spiral wake as indicated by the numeral 69 which will accomplish the desired results.

The various parts can be made in different shapes or sizes and of any suitable material as desired or required.

The present invention is adapted to provide a basic transportation system which incorporates a biconcave flying saucer that serves as a surface effect vehicle which may fly on a cushion of air along an elevated beveled trench such as the trench or track 70 shown in FIG. 2 so that this arrangement can be used for general transportation needs. In addition the present invention provides a high altitude supersonic and hypersonic cruise vehicle. Some of the important advantages or features of the present invention are as follows. There will be a prevention of metal fatigue of the air frame structure as well as elimination of stresses placed on the air frame by distantly placed reaction engines. Also, there will be provided improved lift characteristics obtained by the biconcave construction, as well as an improved means for guiding and steering the vehicle, and a means for braking the speed of the vehicle. Also, a single throttle can be used for control of the multiple engines 55. The present invention will eliminate the need for mechanical devices and thus minimize the disadvantages of rudders, flaps, wing extensions for controls and the like, and there will also be an elemination of angular acceleration on passengers since only angular acceleration is on the console and its supporting standard. Thus the passenger compartment remains as stationary as an elevator. With further reference to the arrangement shown in FIG. 2, a self-cleaning surface effect trench 70 can be utilized.

The propulsion system of the present invention will help counteract the effects of weightlessness since it contributes angular control, the absence of which in other types of vehicles causes weightlessness, and it also gives rise to a magnetic field. The standard can be geared for cruise position. Also, the present invention can be incorporated in a transcontinental transportation system for surface effect systems using the flying saucer arrangement.

Also, one of the safety features of a circular flying saucer is that collisions with the other objects or members would be at a relatively limited point on its periphery. Thus, if all transportation vehicles were circular they would not present large flat surfaces which always result in more energetic destruction and impact than the glancing impact which would occur on point impact. One of the serious hazards of very large aircraft is their landing gear system which occasionally breaks off on touch down or burns occur because of tremendous friction and then fusion of braking surfaces which may lead to fire and tilt over would demand some type of vertical landing onto a revetment like surface. The feature of spinning the multichambered console allows the development of surface effect vehicles which do not require skirts and skirt apertures as do all the present available surface effect vehicles which float on low pressure confined by a plenum. Also, it is believed that the photonic effect of molecular ablation of fuel in the stream of the spinning multi-chambered console will seriously interfere with radar and microwave signals and its thrust may interfere with the guidance system of an infrared missile system. The location of the fuel tank separated from the periphery by two walls offers extra protection from explosive ignition or from friction ignition in the event of a crash landing. It is to be noted that the ordinary propeller wake does not produce free electrons or ablations of fuel or hydrocarbon products and is therefore not photonic. With further reference to the arrangement shown in FIG. 2, the compound wake 69 from the plurality of jets 55 is adapted to be directed downwardly onto the arcuate surface 71 of the trench or track 70 and the wake will then spread out in the direction indicated by the arrows and as indicated by the numeral 87 in FIG. 2 and thus the craft 30 will ride on a cushion of air.

The saucer design of the present invention as well as the construction shown in prior applications Ser. No. 372,178 and 395,535, at low speeds need only the end of a runway or its revetment for landing, whereas conventional aircraft designs require a horizontal approach past obstructions which are often at some distance from the actual landing strip and at high velocity this increases the danger in direct proportion to the size and landing speed of the craft in horizontal approach. The horizontal approach uses up a sizeable length of the runway before a critically dangerous momentum slows down to safety, and it is also this vertical or hovering descent which will help make blind instrument landing safer. The craft constructed according to the present invention is in fact a jet propelled and energized flying gyroscope and as such it acquires the stability of the gyroscope as far as angular stability, orientation, and its capability to sustain the dangers of turbulent air masses through which aircraft must travel at both high and low altitudes. When the present invention is used on massive aircraft which are proposed for transporting a great number of passengers such as, for example, around 750 or more passengers, a suitable type of landing gear may be utilized, and it is believed that the present invention will resolve this problem.

As shown in FIG. 2, the rotatable, pivotal spinning console 46 is adapted to be elevated to a position above the body 31 of the craft 30 and this elevated position is shown in broken lines in FIG. 2, and the unit 46 can be locked into a desired position such as cruise position. The return of the unit 46 to its fuselage position may be brought about for landing and lift off. In addition, this feature will be useful in attaining hypersonic cruise speeds as well as permitting rendezvous in orbit. The standard 49 is adapted to be made in sections or parts such as the parts 61 and 62 to permit the previously described swiveling or rotation to take place.

The atomic degradation products in the jet flame plume will allow resistance to radar detection because of the stream of electrons, ions, and the like in a plasma-like discharge which is known to interfere with radio waves and microwave signals, and this would make the craft less detectable while in flight.

It is to be noted that degradation products occur in the cylinders of power units of propeller craft, but not in the energy wave as produced by jet engines, and it is the augmentation of the energy wave coming from the spinning console which is unique. The spinning console will assume its cruise position by natural reaction on releasing a brake or lock to allow the console to move from the position in line with the fuselage. Return of the console to the position in line with the fuselage would occur automatically by retarding the throttle, to accomplish coasting in orbit or for hovering and touch down in landing. The braking effect of the console can be used to prevent excessive temperatures developing on the aircraft surfaces in re-entry from hypersonic flight. The VTOL capability of the present invention in super and hypersonic craft allows for a practical solution of the traffic saturation problem at airports in which horizontal landings at high speed now makes air transportation increasingly unsafe. Also, VTOL take-off would do much to eliminate traffic delays, and immediate revetment landings from assigned quadrants above the airport on arrival will save fuel and make air transportation more economical, and in addition loss of revenue due to delays, cancellation due to weather and the like would be minimized or eliminated. In addition, automatic instrument controlled landings to a revetment on a vertical line would be safer and much less critical than high velocity horizontal instrument landings. The present invention manifolds the VTOL principle to the supersonic and hypersonic vehicle principle. Acting alone as separate, the device will function as previously described. The present invention manifolds both principles into the production of small or extra large craft which improves the progress in various fields of air transportation and the present invention is convenient and economical to operate as well as providing a convenient means for accomplishing the capability of both VTOL and super and hypersonic craft into a single vehicle.

The present invention is thus a console compounded wake propulsion system and the present invention is adapted to use jet engines already in existence and also the present invention is intended to utilize future types of systems including photon engines, nuclear and ion engines and the like.

Also, in current jets, sliding and tilting jets and in hovering jets which have separate fixed power units, some for lift while others being for cruise, all use banking for turns, and they require flaps, stabilizers, ailerons, trim tabs and the like, all of which initiate periods of angular acceleration to both the craft and passengers. In the present invention the cabin and passengers are subjected only to tangential acceleration in mean free movement from any two points in the various axes, and the propulsion system only is subjected to centrifugal acceleration, and this is important in connection with air transportation. Among the advantages of eliminating centrifugal acceleration on the cabin and passengers is the elimination of steep floor angles which in turn increase seat belt time and restrict the activities of the aircraft staff and their service to passengers. The present invention eliminates banking on turns and in effect the present invention gives better than helicopter comfort to supersonic aircraft. With the present invention the standard can be affixed or positioned in different positions such as at the rear of the craft. It is to be emphasized that with the present invention the console whirls to produce an organized spiral thrust. Analysis of the thrust from a single jet engine would reveal it as made up of segments of spirals. Although multi-nozzle rocket boosters have console arranged jets or nozzles, none has the unique idea of spinning the console.

With the present invention there is a specific type of energy wave or wake form emanating from the spin of the multi-chambered console propulsion unit which may be referred to as photonic. The spin of the console is due to natural reaction to the torque developed within the housing. In the centrally fueled unit, the console is retained by the standard, while in the peripherally fueled unit the console is retained within its housing by the same means that a turbine is retained in its housing. Since the housing extends the length of the propulsion unit, several methods including roller bearing retention of the unit can prevent it from sequestering. With the present invention a compound organized energy wave comes from the multi-chambered spinning jet console.

It is the action of spinning which is intended to contract the turbulence in flight to increase thrust, and spin of the console will help reduce the sensation of weightlessness within the craft since by spin it provides polarity or mean free movement.

In addition, the present invention is to be contrasted with craft having fixed engines since such craft with fixed engines result in each separated unit cancelling out some of the thrust of each separated unit that would be otherwise augmented if their individual thrusts be intermixed to increase turbulence and therefore increase total thrust. The more turbulence created immediately beyond the jet ejection nozzle increases the thrust of the nozzle. On the other hand the spinning console of the present invention organizes and compounds the flow from each chamber producing a more turbulent flow of energy and matter acting to a more effective thrust. In a fixed non-rotating console, a compound flow becomes a rheologic thrust reduced in effectiveness because of its tendency to reduce thrust and turbulence because of current fixed annular nozzle arrangement which produces a rheologic form of energy from each nozzle. Also the invention provides a means of swinging the entire unit away from the craft as illustrated in FIG. 2 and this arrangement provides for more effective control. The biconcave flying saucer design provides improved aerodynamic characteristics. In the present invention there is provided the spinning console of jets, and the thrust chambers are adapted to be controlled by a single throttle, and the present invention is compounded so that a single throttle energizes a plurality of individual propulsion units into a console which produces an un-rheologic contracted compound thrust because of the spin created.

Thus, the manifolding of multiple units into a console which is operated by a single throttle will yield greater thrust when the unit is allowed to spin by its natural torque, and the present invention provides a method of obtaining an organized wake. Furthermore the present invention manifolds the concept of multi-chambered nozzles into a device of simple design, to be controlled by a single throttle and by spinning it as a multi-chambered console. Also, greater lift off efficiency can be obtained in missile blast off by rotating a baffled silo or launch pad plate in the opposite direction to the natural spin of the console. Furthermore the present invention is such that direction and angular control of propulsion unit without the craft rolling can be accomplished. Furthermore the present invention can be used for directional control and increased stability in smooth or turbulent air.

In the present invention, passengers are subjected only to straight line or tangential acceleration, rather than curvilinear, angular or radial acceleration. Physiologically this is important in large transports for the general public as well as unclassified passengers, and is also beneficial in transporting ill, wounded people and the like. In the present invention the propulsion system rather than the passenger compartment is subjected to angular or radial acceleration. Some of the advantages resulting from this phenomena are reduction of motion sickness, no specialized chairs needed for passengers, and the necessity of seat belts is reduced. The take off and landing is less pathophysiologically disturbing than the present subsonic craft which bank for turns. The propulsion system rather than the passenger compartment is used in banking, diving and the like for mean free movement. Also the present invention involves the passengers only in tangential acceleration and the propulsion system sustains all radial accelerations.

Other important features or advantages of the present invention are that tail and wing surface extensions are not necessary for directional control and this is especially important in turbulent air in which situation the craft may be forced into an altitude in which it cannot retrieve itself for controlled flight and hence may dive headlong in constantly increasing speed earthward with a resulting crash. Current stabilizers are ineffective in turbulent air at hypervelocity speeds which cause jamming of controls. Turbulence may be defined as an analysis of angular acceleration, whereas in the present invention analysis of angular acceleration is resisted by the propulsion system more effectively than can the air frame which usually results in disintegration in flight, and the word analysis in this instance is meant to be the opposite of synthesis.

It is to be noted that the usual definition of turbulence is the condition of being violently disturbed, restless or confused, specifically in dynamics, the irregular flow of a gas or fluid caused by an obstacle or by friction, as a ship or airplane in rapid motion. In the present invention the automatic pilot can control the propulsion system and would not be manifolded to ailerons, elevators, flaps, horizontal and vertical trim tabs, and stabilizers which are not subject to the same effects. Also, wind direction is cancelled out as a factor to be considered in take off or landing since the organized wake power controlled through the $xyz$ axes allows preferential selection of angle of attack for aircraft lift. The same type of control cancels out cross-winds, downwind or abrupt atmospheric pressure changes during flight, landing and take off. Thus the present invention provides a means for increasing safety of passengers in flight and also eliminates the necessity of having skipping, ricocheting, and the like on entering boundary atmospheric layers in space flight.

Trim motors for the extensions are eliminated with the present invention. Widely separated propulsion units which have directional control in one or two directions also can be considered mechanical extensions of the air frame and as such continue to place radial stresses on the air frame and wing or lift structures of the air frame. The present invention eliminates the need of tilt wing devices for vertical take off and this type of device places stress of angular acceleration on the air frame since widely spaced propulsion units are placed in the wing, and banking is required for turns and the like. If in the present invention the angle of attack against the air frame is required for testing or other unusual situations, it can be controlled by trimming the propulsion system, by stopping the spin of the console or by trimming the propulsion system in any of the $xyz$ axes. In the present invention trim of the propulsion system can be energized directly to the natural action of the system by advancement and retardation of the throttle, and by a suitable brake and locking mechanism as desired or required.

The console whirls and wherein the console is subjected to spinning parallel motion and within the intake and ejection planes for improved directional control and for stability, produced by the natural torque of its reaction engines imparted to the console.

The power unit, centrifugal, curvilinear and angular radial gravity accelerations are insulated from the cabin preferred straight line and tangential gravity accelerations.

Minor changes in shape, size and rearrangement of details coming within the field of invention claimed may be resorted to in actual practice, if desired.

What is claimed is:

1. In a device of the character described, a flying saucer type of aircraft comprising a disk shaped body member having generally arcuately shaped top and bottom wall surfaces, the inner central portion of the body member being open, cabins and compartments in said member, said body member having a recessed portion, a standard having a portion thereof projecting into said recessed portion, a semi-circular yoke connected to said standard, a circular housing swivelly connected to said yoke, a console rotatably mounted in said housing, a plurality of jet engines mounted in said console, and means for supplying fuel to the engines, said standard consisting of separate sections which are rotatably connected together, means for rotating the sections of the standard relative to each other, means including intermeshing gears for causing pivotal movement of the entire standard, and whereby the plurality of engines produce an organized compound thrust and spiral wake.

2. The structure as defined in claim 1 and further including a trench and track-like member having an arcuate surface for receiving the spiral wake produced by the engines so that the craft can be flown in a cushioned manner above the trench, track and the like.

3. In a console compounded wake propulsion system, a standard, a semi-circular yoke affixed to said standard, a circular housing pivotally connected to said yoke, a console rotatably mounted in said housing, a plurality of engines mounted in said console, whereby the plurality of engines produce an organized spiral wake and thrust, said standard consisting of at least two partially telescoped sections which rotate relative to each other on a first axis, said standard being pivotable at its proximate point of fixation to the airframe about an axis perpendicular to said first axis, means for rotating said sections relative to each other, means for pivoting the standard, and means for spinning the console.

References Cited

UNITED STATES PATENTS 2,937,492   5/1960   Lehberger _____ 255—23

MILTON BUCHLER, *Primary Examiner.*

FERGUS S. MIDDLETON, *Examiner.*

L. C. HALL, B. BELKIN, *Assistant Examiners.*